United States Patent

Bereck et al.

[11] Patent Number: 6,001,132
[45] Date of Patent: Dec. 14, 1999

[54] PREPARATION OF AQUEOUS SOLUTIONS SUITABLE FOR FINISHING CELLULOSE CONTAINING TEXTILE MATERIALS

[75] Inventors: Attila Bereck, Wermelskirchen; Klaus Flory, Leimen; Matthias Kummer, Mannheim, all of Germany

[73] Assignee: BASF Aktiengesellschaft, Ludwigshafen, Germany

[21] Appl. No.: 07/504,881

[22] Filed: Apr. 5, 1990

[30] Foreign Application Priority Data

Apr. 13, 1989 [DE] Germany ............................ 3912084.8

[51] Int. Cl.$^6$ ......................... D06M 13/10; D06M 13/18
[52] U.S. Cl. ...................... 8/116.1; 181/182; 181/183; 181/185; 181/196; 181/120; 564/60; 544/180; 544/194
[58] Field of Search ............................ 8/116.1, 181, 182, 8/185, 196, 120; 564/60; 544/180, 194

[56] References Cited

U.S. PATENT DOCUMENTS 3,840,339 10/1974 Yamamoto et al. ..................... 8/120
4,280,812 7/1981 Donaldson et al. ..................... 8/120

OTHER PUBLICATIONS

Derwent Accession No. 88–365 906 (JP–A–63 277 227).

*Primary Examiner*—Margaret Medley
*Attorney, Agent, or Firm*—Oblon, Spivak, McClelland, Maier & Neustadt, P.C.

[57] ABSTRACT

Aqueous solutions of N-methylol compounds of carboxamides, urethanes, ureas and aminotriazines or of N-methylol ethers of these compounds that are suitable for finishing cellulose-containing textile materials are prepared by reaction of compounds having one or more N—H groups in aqueous solution with formaldehyde and, in the case of N-methylol ethers, with an alcohol by adding boron trifluoride, a boron trifluoride addition compound or tetrafluoroboric acid or a salt thereof to the aqueous solutions during or immediately after the reaction.

9 Claims, No Drawings

PREPARATION OF AQUEOUS SOLUTIONS SUITABLE FOR FINISHING CELLULOSE CONTAINING TEXTILE MATERIALS

The present invention relates to an improved process for preparing aqueous solutions of N-methylol compounds of carboxamides, urethanes, ureas and aminotriazines or of N-methylol ethers of these compounds that are suitable for finishing cellulose-containing textile materials by reacting compounds having one or more N—H groups in aqueous solution with formaldehyde and, in the case of N-methylol ethers, with an alcohol.

The N-methylol ether solutions, which mainly serve as finishers for cellulose-containing textile materials, are customarily prepared by etherifying appropriate N-methylol compounds in the presence of a mineral acid, for example hydrochloric acid, sulfuric acid or phosphoric acid. Petersen shows in the Handbook of Fiber Science and Technology: Vol. II, Chemical Processing of Fibers and Fabrics, Functional Finishes, Part A, Marcel Dekker, Inc., 1983, in particular on pages 200 to 205, that the reaction system in question here is a system of equilibrium reactions and that the overall equilibrium is normally more on the side of the N-methylol compound than on that of the N-methylol ether.

On pages 205 to 217 of the cited reference Petersen mentions customary catalysts for the textile finishing process, including inter alia magnesium salts combined with tetrafluoroborates (pages 209/210) and zinc tetrafluoroborate (page 210). These assistants are customarily only added to the finishing liquor immediately prior to the finishing process.

On pages 54 to 205 of the cited reference Petersen describes the general principles behind preparing textile finishes composed of compounds having N—H groups and formaldehyde with or without an alcohol.

Ullmanns Encyklopädie der technischen Chemie, 4th edition, Volume 11, 1976, page 617, recommends boron trifluoride and its adducts for use as catalysts for condensation and polymerization reactions, especially for the dehydration of alcohols, acids or ketones.

It is an object of the present invention to make available a process that provides aqueous solutions of N-methylol compounds and N-methylol ethers which, applied under benign finishing conditions with a small amount of condensation catalyst, are highly effective and bring about sufficiently low formaldehyde values on the finished fabric.

We have found that this object is achieved by a process for preparing an aqueous solution of an N-methylol compound of a carboxamide, urethane, urea or aminotriazine or of an N-methylol ether thereof that is suitable for finishing a cellulose-containing textile material by reaction of a compound having one or more N—H groups in aqueous solution with formaldehyde and, in the case of an N-methylol ether, with an alcohol, which comprises adding boron trifluoride, a boron trifluoride addition compound or tetrafluoroboric acid or a salt thereof to the aqueous solution during or immediately after said reaction.

If N-methylol ethers are desired, the compounds having one or more N—H groups are first reacted with formaldehyde—in situ or in a separate preparation stage—to give the N-methylol compounds of carboxamides, urethanes, ureas and aminotriazines and then transferred into the corresponding N-methylol ethers.

If boron trifluoride is used, it is conveniently introduced into the reaction solution in gas form. It is even more convenient to employ the adducts of boron trifluoride which are liquid under standard conditions, for example adducts with methanol, dimethyl ether, diethyl ether, tetrahydrofuran, water, acetic acid, phosphoric acid or phenol, or aqueous tetrafluoroboric acid. Tetrafluoroboric acid can also be produced in situ from its metal salts and another mineral acid. Boron trifluoride and boron trifluoride adducts are preferred to tetrafluoroboric acid and its salts.

It is advisable to carry out the process according to the present invention using the boron-fluorine compounds in catalytic amounts, for example in an amount of from 0.001 to 0.2 mole, in particular from 0.01 to 0.1 mole, per mole of N-methylol group or etherified N-methylol group.

In a preferred embodiment, the aqueous solutions of N-methylol ethers of carboxamides, urethanes, ureas and aminotriazines are prepared by reacting the corresponding N-methylol compounds with an alcohol in an aqueous phase at pH 0–3 in the presence of boron trifluoride, a boron trifluoride addition compound or tetrafluoroboric acid and then adjusting the pH of the solution to 4–10.

However, it is also possible for the boron compounds not to be added to the solutions until immediately after they have been prepared and before they are put into storage or shipped out to the customer.

The preferred embodiment of the process for preparing aqueous solutions of N-methylol ethers according to the present invention is carried out in strongly acid solution, for example at pH 0–3, in particular pH 1–2. Above pH 3, the process according to the present invention gives distinctly worse results. The low pH can be set using the customary mineral acids.

In general, the reaction comprises reacting aqueous solutions of the N-methylol compound having a solids content of customarily from 40 to 85% by weight and a pH of normally from 4 to 10 with from 1 to 1.5 moles, in particular from 1.1 to 1.35 moles, of an alcohol per N-methylol group at from 20 to 60° C., in particular at from 30 to 50° C. The reaction time to achieve the desired degree of etherification is normally within the range from 0.5 to 8 hours, but in most cases it is from 2 to 5. Thereafter the pH is re-adjusted to 4–10, in particular 4–7, with a customary base, for example sodium hydroxide solution or potassium hydroxide solution.

The N-methylol ether solutions thus obtained are in general diluted with water to a water content of from 20 to 80% by weight, in particular from 35 to 60% by weight. The degree of etherification of the N-methylol groups in the process according to the present invention is normally from 70 to 90%, compared with only 30–50% of a similar process without the use of boron-fluorine compounds.

The process according to the present invention concerns in particular the preparation of aqueous solutions of N-methylol ethers of the general formula I

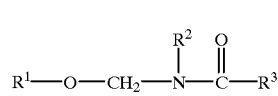

where $R^1$ is $C_1$–$C_{10}$-alkyl which may be interrupted by oxygen atoms, $R^2$ is hydrogen, $CH_2OR^1$, or $C_1$–$C_8$-alkyl which may additionally carry hydroxyl groups and/or $C_1$–$C_4$-alkoxy groups as substituents and be interrupted by oxygen atoms and/or $C_1$–$C_4$-alkyl-carrying nitrogen atoms, and $R^3$ is hydrogen, $C_1$–$C_{10}$-alkyl, $C_1$–$C_{10}$-alkoxy which may be interrupted by oxygen atoms, or the group (—$NR^2$—$CH_2OR^1$) , or else $R^2$ and $R^3$ form a five- or six-membered ring and if $R^3=(-NR^2-CH_2OR^1)$, moreover, two such rings may be fused together via the carbon atoms on the $R^2$ radicals α-disposed to the amide nitrogens to form a bicyclic system, by reacting the corresponding N-methylol compounds of the general formula (II)

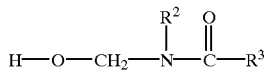

II with alcohols of the general formula (III)

III $R^1$ is $C_1$–$C_{10}$-alkyl which may be interrupted by oxygen atoms. Examples of $R^1$ are: n-butyl, isobutyl, sec-butyl, tert-butyl, n-pentyl, n-hexyl, 2-ethylhexyl and 2-methoxyethyl; of particular interest are the $C_1$–$C_3$-alkyl groups ethyl, n-propyl, isopropyl and especially methyl.

$R^2$ is hydrogen, $CH_2OR^1$, or in particular a $C_1$–$C_8$-alkyl radical which may additionally carry hydroxyl groups and/or $C_1$–$C_4$-alkoxy groups as substituents and may be interrupted by oxygen atoms and/or by $C_1$–$C_4$-alkyl-carrying nitrogen atoms.

$R^3$ is hydrogen, $C_1$–$C_{10}$-alkyl, $C_1$–$C_{10}$-alkoxy which may be interrupted by oxygen atoms, or in particular the group $(-NR^2-CH_2OR^1)$.

The process according to the present invention has particular importance for those N-methylol ethers I where $R^2$ and $R^3$ form a five- or six-membered ring. If $R^3=(-NR^2-CH_2OR^1)$, moreover, two such rings may be fused together via the carbon atoms on the Rz radicals α-disposed to the amide nitrogens to form a bicyclic system.

Examples of N-methylol ethers I which can be prepared in aqueous solution by the process according to the present invention are:

amides of $C_1$–$C_{11}$-carboxylic acids, for example formic acid, acetic acid, propionic acid, butyric acid or valeric acid, which carry one or two $CH_2OR^1$ groups on the nitrogen, carbamates having $C_1$–$C_{10}$-alkyl groups in the ester moiety which may be interrupted by oxygen atoms, for example methyl, ethyl, n-propyl, isopropyl, 2-methoxyethyl or n-butyl, which carry two $CH_2OR^1$ groups on the nitrogen, urea having from 1 to 4 $CH_2OR^1$ groups on the nitrogen atoms, cyclic ethyleneureas of the general formula Ia

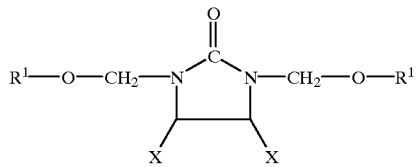

Ia where the radicals X are different or preferably identical and each is hydrogen, hydroxyl or $C_1$–$C_4$-alkoxy, for example methoxy or ethoxy, cyclic propyleneureas of the general formula Ib

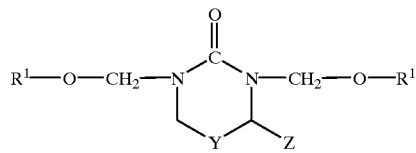

Ib where Y is $CH_2$, CHOH, $C(CH_3)_2$, an oxygen atom or a $C_1$–$C_4$-alkyl-carrying nitrogen atom and Z is hydrogen or a $C_1$–$C_4$-alkoxy, for example methoxy or ethoxy, bicyclic glyoxaldiureas of the general formula Ic

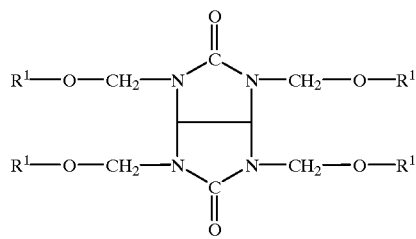

Ic bicyclic malondialdehydediureas of the general formula Id

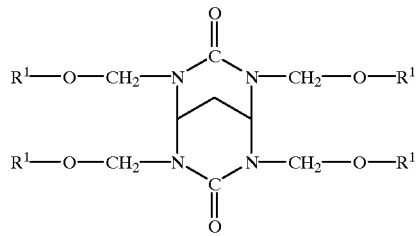

Id

The process according to the present invention further concerns the preparation of aqueous solutions of melamine derivatives of the general formula IV

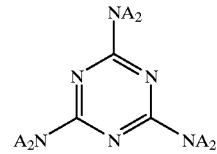

IV where the radicals A are identical or different and each is hydrogen or $CH_2OR^1$, although at least one of the radicals A must be $CH_2OR^1$, by reacting the corresponding N-methylol melamines of the general formula V

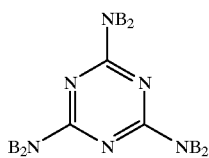

where the A analogs B are each hydrogen or CH$_2$OH, with alcohols of the general formula III.

Examples of melamine derivatives IV which can be prepared in aqueous solution by the process according to the present invention are methoxymethylmelamine, bis-(methoxymethyl)melamine, tris(methoxymethyl)melamine, tetrakis(methoxymethyl)melamine, pentakis (methoxymethyl)melamine and hexakis(methoxymethyl) melamine and the analog ethoxymethyl and isopropyloxymethyl compounds.

The aqueous solutions of N-methylol compounds and N-methylol ethers prepared by the process according to the present invention find utility chiefly for the low-formaldehyde finishing of cellulose-containing textile materials. The boron compounds contained therein act together with customary catalysts such as magnesium or zinc salts to cause the finish to condense with the fabric in the course of the finishing process. The solutions have the advantage over products prepared by prior art processes of producing—for similar finish characteristics, benign finishing conditions such as low condensation temperature or short condensation time and a low amount of condensation catalyst—significantly lower values of detachable formaldehyde on the finished textiles. The boron—"precatalyzed" finishing solutions have an unlimited shelflife and also are user friendly, since they can be used by the textile finisher in the same way as customary solutions without boron compounds without having for example to add additional reagents such as sodium tetrafluoroborate.

The preferred embodiment of the process for preparing aqueous solutions of N-methylol ethers according to the present invention is notable for a low thermal stress during the reaction, causing only a low level of secondary or decomposition products, for a low level of readily soluble inorganic salts in the usually highly concentrated aqueous product solutions obtained, thereby reducing the risk of crystallization of salt—for an only low excess requirement of alcohol, thereby obviating any complicated removal of unconverted alcohol from the ready-prepared product, and in particular for a high degree of etherification of the N-methylol groups of normally from 70 to 90%. The amount of boron compound which is used for the etherification reaction and which after all survives the reaction is sufficient to cause the above-described advantageous effect in the finishing process.

EXAMPLE 1

Etherification in the presence of tetrafluoroboric acid 215.3 g of an 82.6% strength by weight aqueous N,N'-dimethylol-4,5-dihydroxyethyleneurea solution (corresponding to 1.0 mol in the examples of the urea derivative) at pH 8.9 were mixed with 86.4 g of methanol (corresponding to 2.7 mol) and then with 16.3 g of a 25% strength by weight aqueous tetrafluoroboric acid solution (corresponding to 0.05 mol of HBF$_4$), and the pH of the mixture dropped to 1.5. The reaction mixture was stirred at 35° C. for 5 hours. The progress of the reaction and the formation of primary and secondary products were monitored by chromatographic methods.

The reaction mixture was diluted with 92 g of water and adjusted to pH 5.0 with 3.0 g of a mixture of equal parts by weight of 50% strength by weight sodium hydroxide solution and 50% strength by weight potassium hydroxide solution to give 413 g of an aqueous solution of N,N'-dimethoxymethyl-4,5-dihydroxyethyleneurea having a water content of 39.7% by weight. The degree of etherification of the N-methylol groups was 78%.

EXAMPLE 2

Etherification in the presence of sodium tetrafluoroborate/sulfuric acid 193 g of an 83% strength by weight aqueous N,N'-dimethylol-4,5-dihydroxyethyleneurea solution (corresponding to 0.9 mol of the urea derivative) at pH 8.9 were mixed with 69.1 g of methanol (corresponding to 2.16 mol) and then with 7.6 g of a mixture of equal parts by weight of sodium tetrafluoroborate and 50% strength by weight sulfuric acid (corresponding to 0.035 mol of NaBF$_4$), and the pH of the reaction mixture dropped to 1.5. After 5 hours' stirring at 35° C. the reaction had ended. The progress of the reaction and the formation of primary and secondary products were monitored by chromatographic methods.

The reaction mixture was diluted with 166 g of water and adjusted to pH 5.0 with 2.8 g of 50% strength by weight sodium hydroxide solution to give 438 g of an aqueous solution of N,N'-dimethoxymethyl-4,5-dihydroxyethyleneurea having a water content of 53% by weight. The degree of etherification of the N-methylol groups was 86%.

COMPARATIVE EXAMPLE A

Etherification in the presence of sulfuric acid alone 256 g of a 70% strength by weight aqueous N,N'-dimethylol-4,5-dihydroxyethyleneurea solution (corresponding to 1.0 mol of the urea derivative) at pH 8.6 were mixed with 70.4 g of methanol (corresponding to 2.2 mol) and then with 6.2 g of 75% strength by weight sulfuric acid, and the pH of the reaction mixture dropped to 1.3. After heating to 35° C. the mixture was stirred at the stated temperature for 5 hours. The progress of the reaction and the formation of primary and secondary products were monitored by chromatographic methods.

The reaction mixture was worked up to an aqueous solution containing N,N'-dimethoxymethyl-4,5-dihydroxyetihyleneurea as essential constituent and having a water content of from 3 to 53% by weight as described in Example 2. The degree of etherification of the N-methylol group was 37%.

EXAMPLE 3

Etherification in the presence of boron trifluoride/methanol adduct 580 g of methanol (corresponding to 18.1 mol) were added to 2000 g of a 70% strength by weight aqueous N,N'-dimethylol-4,5-dihydroxyethyleneurea solution (corresponding to 7.87 mol of the urea derivative) at room temperature with stirring. The pH of the solution was reduced from 5.9 to 1.6 by adding 25 g of a 51% strength by weight solution of boron trifluoride/methanol adduct in methanol (corresponding to 0.13 mol of BF$_3$.CH$_3$OH). After heating to 40° C. the mixture was stirred at the stated temperature for 4 hours. The progress of the reaction and the formation of primary and secondary products were monitored by chromatographic methods.

The solution was cooled down to room temperature and adjusted to pH 5.7 by adding 38.2 g of a 25% strength by weight sodium hydroxide solution. Unconverted methanol was distilled off at 40° C. under a reduced pressure of from 60 to 80 Torr to leave a 75% strength by weight ready-to-use crosslinker solution.

EXAMPLE 4/COMPARATIVE EXAMPLE B

Addition of boron trifluoride/methanol adduct without etherification 13.7 g of a 51% strength by weight solution of boron trifluoride/methanol adduct in methanol (corresponding to 0.07 mol of $BF_3 \cdot CH_3OH$) were slowly added to 1000 g of a 70.5% strength by weight aqueous N,N'-dimethylol-4,5-dihydroxyethyleneurea solution (corresponding to 3.96 moles of the urea derivative) at pH 5.9 (corresponding to Comparative Example B) with stirring and external cooling. After 15 minutes' stirring at room temperature, the pH was 1.1. Stirring was continued at the stated temperature for a further 15 minutes and the mixture was then adjusted to pH 5.9 by adding 18.3 g of a 25% strength by weight sodium hydroxide solution. Filtration left 1030 g of a 71.5% strength by weight ready-to-use crosslinker solution.

EXAMPLE 5/COMPARATIVE EXAMPLE C

Addition of boron trifluoride/methanol adduct after etherification 16.3 g of a 51% strength by weight solution of boron trifluoride/methanol adduct in methanol were slowly added dropwise with stirring and external cooling to 1430 g of a 73.1% strength by weight aqueous N,N'-dimethoxymethyl-4,5-dihydroxyethyleneurea solution at pH 5.2, the methylol groups having been etherified to a degree of about 50% in a conventional manner (corresponding to Comparative Example C). After 20 minutes, the pH was 2.1. Stirring was continued at the stated temperature for a further 10 minutes, and the solution was brought back to pH 5.0 by adding 18.4 g of a 25% strength by weight sodium hydroxide solution. Filtration left 1460 g of a 73.6% strength by weight ready-to-use crosslinker solution.

Application properties in textile finishing

100 % cotton shirt poplin having a basis weight of 140 g/m² was impregnated with the aqueous solutions of Examples 3, 4 and 5 and of Comparative Examples B and C and magnesium chloride hexahydrate as condensation catalyst by means of a pad-mangle. The wet pickup was about 70% by weight. The fabric was dried at 110° C. to a residual moisture content of about 8% by weight. This was followed by condensation under the conditions indicated in the following table:

|  | Fabric without finish | Crosslinker solution of | | | | |
|---|---|---|---|---|---|---|
|  |  | Ex. 3 | Ex. 4 | Ex. B (for comp.) | Ex. 5 | Ex. C (for comp.) |
| Amounts of crosslinker solution [g/l] | — | 60 | 60 | 60 | 60 | 60 |
| MgCl$_2$.6H$_2$O [g/l] | — | 10 | 10 | 15 | 10 | 20 |
| Condensation time [min] | — | 4 | 2 | 4 | 4 | 4 |
| Condensation temperature [° C.] | — | 150 | 150 | 150 | 150 | 160 |
| Dry crease recovery [°] | 110 | 233 | 267 | 254 | 203 | 193 |
| Monsanto rating | 1.5 | 3 | 3.3 | 3 | 3 | 3 |
| Tensile strength [N] | 406 | 270 | 270 | 276 | 273 | 286 |

-continued

|  | Fabric without finish | Crosslinker solution of | | | | |
|---|---|---|---|---|---|---|
|  |  | Ex. 3 | Ex. 4 | Ex. B (for comp.) | Ex. 5 | Ex. C (for comp.) |
| Shrinkage: |  |  |  |  |  |  |
| Warp [%] | 3 | 0.5 | 0.5 | 0.5 | 0.5 | 1 |
| Weft [%] | 4 | 1 | 1 | 0.5 | 1 | 1 |
| Residual formaldehyde by |  |  |  |  |  |  |
| LAW 112 [ppm] | 4 | 92 | 290 | 558 | 91 | 147 |
| AATCC 112 [ppm] | 7 | 154 | 410 | 695 | 82 | 223 |
| Shirley I [ppm] | 33 | 343 | 289 | 576 | 442 | 477 |

The dry crease recovery was determined by German Standard Specification DIN 53 890 (sum of warp+weft).

The Monsanto smoothness rating and the shrinkages were determined on washing after whizzing at 60° C. for 20 minutes.

The tensile strength was determined by German Standard Specification DIN 53 857 (fabric sample 40×100 mm).

Detachable formaldehyde on the finished fabric was determined by the three standard methods mentioned.

The results in the table show that the crosslinker solutions prepared according to the present invention, despite being employed under milder condensation conditions (a condensation time of 2 min instead of 4 min in the case of Example 4, and a condensation temperature of 150° C. instead of 160° C. in Example 5) and with a smaller amount of catalyst (10 g/l instead of 15 or 20 g/l), give slightly higher dry crease recovery angles and Monsanto smoothness ratings and distinctly lower detachable formaldehyde values on the finished fabric, tensile strength and shrinkage being similar.

We claim:

1. A process for preparing an aqueous solution of an N-methylol compound of a carboxamide, urethane, urea or aminotriazine that is suitable for finishing a cellulose-containing textile material comprising reacting said carboxamide, urethane, urea or aminotriazine with formaldehyde in an aqueous solution, further comprising adding a member selected from the group consisting of boron trifluoride, a boron trifluoride addition compound, tetrafluoroboric acid, and a salt of tetrafluoroboric acid to the aqueous solution during said reaction.

2. A process for preparing an aqueous solution of an N-methylol ether of a carboxamide, urethane, urea or aminotriazine comprising reacting the corresponding N-methylol compound with an alcohol in an aqueous phase at pH 0–3 in the presence of a member selected from the group consisting of boron trifluoride, a boron trifluoride addition compound and tetrafluoroboric acid and subsequently adjusting the pH of the solution to 4–10.

3. A process as claimed in claim 2, for preparing an aqueous solution of an N-methylol ether of the formula I

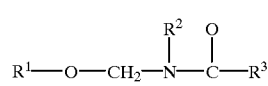

wherein $R^1$ is $C_1$–$C_{10}$-alkyl or $C_1$–$C_{10}$-alkyl which is interrupted by oxygen atoms, $R^2$ is hydrogen, $CH_2OR^1$, or $C_1$–$C_8$-alkyl which is optionally substituted by a member selected from the group consisting of hydroxyl groups, $C_1$–$C_4$-alkoxy groups and mixtures thereof, and is optionally interrupted by a member selected from the group consisting of oxygen atoms and $C_1$–$C_4$-alkyl-carrying nitrogen atoms, and $R^3$ is hydrogen, $C_1$–$C_{10}$-alkyl, $C_1$–$C_{10}$-alkoxy which optionally is interrupted by oxygen atoms, or the group (—$NR_2$—$CH_2$—$OR^1$), or else $R^2$ and $R^3$ form a 5- or 6-membered ring and if $R^3$=(—$NR^2$—$CH_2$—$OR^1$), moreover, two such rings may be fused together via the carbon atoms on the $R^2$ radicals α-disposed to the amide nitrogens to form a bicyclic system, comprising reacting the corresponding N-methylol compound of the formula

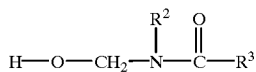   II with an alcohol of the formula III

R¹—OH   III.

4. A process as claimed in claim 3 for preparing an N-methylol ether I where $R^3$ is (—$NR^2$—$CH_2OR^1$).

5. A process as claimed in claim 3 for preparing an N-methylol ether I where $R^2$ is $C_1$–$C_8$-alkyl which is optionally substituted by a member selected from the group consisting of hydroxyl groups, $C_1$–$C_4$-alkoxy groups and mixtures thereof, said $C_1$–$C_8$-alkyl optionally being interrupted by a member selected from the group consisting of oxygen atoms $C_1$–$C_4$-alkyl-carrying nitrogen atoms, and mixtures thereof.

6. A process as claimed in claim 3 for preparing an N-methylol ether I wherein $R^1$ is $C_1$–$C_3$-alkyl.

7. A process as claimed in claim 3 for preparing an N-methylol ether I where $R^2$ and $R^3$ form a 5- or 6-membered ring.

8. A process as claimed in claim 2 for preparing an aqueous solution of a melamine derivative of the formula IV

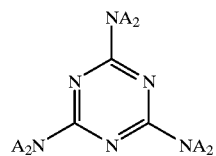   IV where the radicals A are identical or different and each is hydrogen or $CH_2OR^1$, and at least one of the radicals A must be $CH_2OR^1$, by reacting the corresponding N-methylol melamine of the formula V

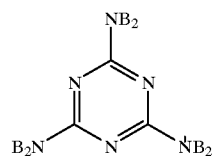   V wherein the groupings B are each hydrogen or $CH_2OH$, with an alcohol of the formula III

R¹—OH   III.

9. A process for preparing an aqueous solution of an N-methylol ether of a carboxamide, urethane, urea or aminotriazine that is suitable for finishing a cellulose-containing textile material comprising reacting said carboxamide, urethane, urea or aminotriazine with formaldehyde and an alcohol in an aqueous solution, further comprising adding boron trifluoride, a boron trifluoride addition compound, tetrafluoroboric acid, or a salt of tetrafluoroboric acid to the aqueous solution during said reaction.

* * * * *

UNITED STATES PATENT AND TRADEMARK OFFICE
CERTIFICATE OF CORRECTION

PATENT NO. : 6,001,132
DATED : December 14, 1999
INVENTOR(S) : Attila BERECK et al.

It is certified that error appears in the above-identified patent and that said Letters Patent is hereby corrected as shown below:

On the title page, item [54] and at the top of Column 1, the title is incorrectly listed. It should be:

--[54] PREPARATION OF AQUEOUS SOLUTIONS SUITABLE FOR FINISHING CELLULOSE-CONTAINING TEXTILE MATERIALS--

On the title page, item [75], the 4th Inventor has been omitted. It should read as follows:

--[75] Inventors: Attila Bereck, Wermelskirchen; Klaus Flory, Leimen; Matthias Kummer, Mannheim; Friedrich Reinert; Wachenheim; all of Germany--

Signed and Sealed this

Twenty-third Day of January, 2001

Attest:

Q. TODD DICKINSON

*Attesting Officer*

*Commissioner of Patents and Trademarks*